United States Patent [19]

Herbert et al.

[11] Patent Number: 4,596,717

[45] Date of Patent: Jun. 24, 1986

[54] PREPARING A PIECE OF WOOD FOR IMPREGNATION

[75] Inventors: Werner Herbert, Markdorf; Wunnibald Kunz, Friedrichshafen, both of Fed. Rep. of Germany

[73] Assignee: Dornier System GmbH, Friedrichshafen, Fed. Rep. of Germany

[21] Appl. No.: 628,387

[22] Filed: Jul. 6, 1984

[30] Foreign Application Priority Data

Jul. 9, 1983 [DE] Fed. Rep. of Germany ....... 3324809

[51] Int. Cl.[4] .......................... B23B 39/16; B05D 3/12

[52] U.S. Cl. .................................... 427/291; 144/364; 144/365; 408/42; 408/58; 427/325

[58] Field of Search ................ 427/291, 325; 144/363, 144/364, 367, 365, 369; 408/42, 53

[56] References Cited

U.S. PATENT DOCUMENTS

| | | | |
|---|---|---|---|
| 1,012,207 | 12/1911 | Kolossvary et al. | 427/291 |
| 4,206,793 | 6/1980 | Kipp | 427/291 X |

*Primary Examiner*—Michael R. Lusignan
*Attorney, Agent, or Firm*—Ralf H. Siegemund

[57] ABSTRACT

A piece of wood is prepared for impregnation by causing it in steps to be perforated by a plurality of needles which are moved back and forth with the workpiece, and either rotate individually or are subject to additional oscillatory or impact-producing axial movement.

12 Claims, 1 Drawing Figure

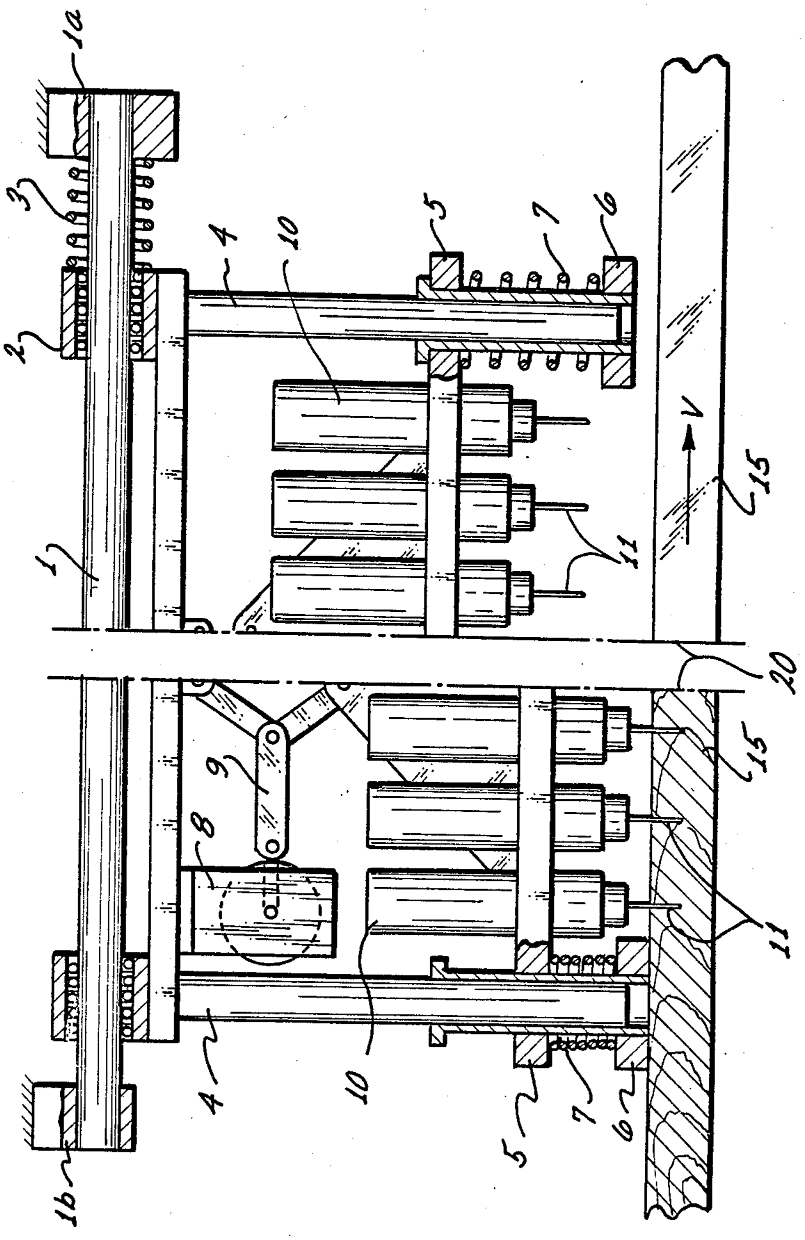
1a
3
2
1
4
10
5
7
6
V
15
11
20
9
8
1b

PREPARING A PIECE OF WOOD FOR IMPREGNATION

BACKGROUND OF THE INVENTION

The present invention relates to impregnating wood, and more particularly the present invention relates to a method for preparing a piece of wood for purposes of impregnating it with a material to protect the wood against parasites and other dangerous insects, as well as, or alternatively, for rendering the wood flame retardant.

It is generally known to treat pieces of wood with an impregnating material so as to protect them against parasites such as termites, or the like, fungus, etc. It is also known to impregnate wood so as to render it inflammable or at least flame retardant. Generally speaking, it is known to provide such impregnation by dipping the wood into a tank filled with the impregnating liquid, or by brushing the liquid onto the surface, or spraying the piece of wood with the impregnating material. Of course different brands and kinds of wood differ considerably with regard to their ability to permit penetration of liquid into the texture of the material. In some instances, the texture is so dense that deep penetration is practically prevented. In such a situation, it has been the practice to force the impregnating medium by means of an autoclave into the wood. However, even in an autoclave fir wood permits a penetration transversely to the fiber of, at the most, about 1 mm deep, which is not sufficient.

Independently from the foregoing, it is known to perforate the surface of a piece of wood by means of rolls having pins or cutters arranged along the periphery. A treatment of a piece of wood with such a roll serves the purpose of preparing the piece to permit deeper impregnation of the material. In practice, penetration depth up to 10 mms can be obtained. It was found, however, that on account of the bending moment acting on the pins or pricks used to penetrate into the wood, the surface of the wood suffers, and particularly the surface near fibers are torn. This then means that the wood loses strength. Also, from an overall point of view the surface of the wood appears quite torn and so they cannot be used anymore for decorative purposes, for example, paneling or the like.

Another known method for perforating the surface of the wood uses rotating pins. That practice was found to be disadvantageous, however, as the pins may and do break. This is particularly the case when such a pin or needle hits a knot in the wood. It is well known that knots resist very heavily any kind of penetration which in turn means that the needles will wear heavily and may be heated. Of course, they may even break.

DESCRIPTION OF THE INVENTON

It is an object of the present invention to provide a new and improved method for preparing pieces of wood for purposes of subsequent impregnation with a liquid medium.

It is a particular object of the present invention to prepare pieces of wood having by and in themselves a small penetration depth on account of a high density so that they are generally difficult to impregnate.

It is a particular object of the present invention to provide a new and improved method for preparing a piece of wood for impregnating it with a protective liquid or the like, which is economical and particularly will not or hardly influence the strength of the material; moreover, the surface should not suffer as to appearance.

In accordance with the preferred embodiment of the present invention, it is suggested to provide for a perforation into the surface of a piece of wood by means of a large plurality of pins or needles; these needles are caused to axially advance towards and into the piece of wood to be so prepared, and in addition they are either turned about their longitudinal axis or they are caused to undergo in axial direction an impact motion while they are concurrently lubricated with water serving also as a coolant.

In furtherance of the invention, it is suggested, by way of example, to continuously cause the needles to rotate or to undergo a shaking or impacting motion. Conventional needles, preferably with an oval cross-section, are to be used. The needles are preferably arranged in a staggered relationship in a holder or head, which cause the needles to be forced into the wood simultaneously. Separately, however, each needle is to be driven, for example, for purposes of rotating them individually. Alternatively, a hammer-like instrument causes the head to undergo impacting motion.

It is therefore essential that the needles undergo axial motion for purposes of obtaining perforation. This way destruction of fibers is prevented as it occurs, for example, in well-known wood working procedure such as drilling. The needles, particularly when they are very sharp and pointed, merely force fibers apart without tearing them. If one uses, for example, a piece of wood and provides pores in the stated manner on both sides and at a distance from each other approximating 2 mms as measured transversely to the extension of the fibers, one obtains in fact a situation that the impregnating medium will subsequently reach all wooden cells.

Wood of a so-called grade 1 will be reduced in strength only by about 5%. Wood of a grade 2 quality does not suffer any loss in strength. The wood breaks just as the untreated one at knot holes and not in the pores. The inventive method permits treatment of wooden planks with knots on both sides extending up to 2 cm deep into the wood. It is important that the inventive method can be practiced without expensive, special tooling. One can use conventional needles, for example, cold hardened sewing needles or the like.

In the case the needles are individually caused to rotate, one may require, for example, about 100 needles in one particular head, and they are arranged in a staggered relationship to each other in a particular mounting area. It is necessary, however, to provide a separate motor for each of the needles. One may use here small synchronous motors, causing the needles to rotate continuously. The head is forced in a staggered relationship towards the piece of wood to be prepared which is deemed in a resting position for that purpose. An oval cross-section for the needles was found to reduce the friction.

In case of an impacting type motion, the needles are likewise staggerdly arranged in the head, but at a smaller spacing within the mounting area. They are rigidly secured or clamped into the mounting head, which is caused by a hammer-like construction to undergo shaking axial motion, i.e., axial with respect to the direction of each of the parallely disposed needles. Generally speaking, the axial impacting or shacking or vibrating motion occurs at a faster rate than the general advance and retraction of the head from wood.

In all cases one should provide for lubrication as well as cooling, and here a previous wetting of the wooden surface with water is advantageous. This mode of lubricating and cooling can be used for all of the kinds of perforation as described. Moreover, water is very inexpensive and, most importantly, it is not dangerous to wet wood in that fashion. The water reduces the penetration resistance for the needles, cools them, and thus extends their uselife. The wetting with water can, for example, be obtained through previous dipping of the piece of wood into water in a tank, or by spraying water onto the surface. In the case of fresh wood that is still moist, the water treatment may not be necessary. Perforating fresh wood in the stated manner has the additional advantage that the wood will more uniformly dry, and will in fact less distort than untreated pieces.

DESCRIPTION OF THE DRAWINGS

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings in which:

The FIGURE illustrates somewhat schematically a side and partial section view of equipment for practicing the preferred embodiment of the present invention in accordance with the best mode thereof.

The drawing illustrates particularly equipment for perforating pieces of wood under utilization of the principles of rotating needles. The equipment is particularly designed to provide the rotation for needles and additional propagation between a piece of wood and the perforating equipment, taking into consideration that a length wise movement of the piece of wood is needed in order to have different surface portions of the piece of wood perforated, and in addition a reciprocal motion is needed between the perforating equipment and the respective wooden portion being in front of the perforating equipment. Therefore, it is necessary to provide for longitudinal drive and motion of the wooden work piece and for reciprocating motion towards and away from the surface of the wooden work piece to be fork perforated.

Proceeding now to further details, the FIGURE shows a work and operating head which includes a horizontal guide 1 provided between stationary mounts 1*a* and 1*b*, and a carriage 2 rides on these guide rods 1. A spring 3 is interposed between the stationary part 1*a* for mounting the guide rod 1 and the carriage 2. The carriage 2 is primarily the support for vertical guide posts 4 supporting a plate 5 in a manner which permits the plate 5 to reciprocate on the guide posts 4. The plate 5 therefore undergoes motion along the axes of guides 1, as well as reciprocating motion in directions perpendicularly thereto. The plate 5 carries drives 10 for pins or needles 11. In addition, plate 5 carries a spring-loaded (springs 7) follower plate 6 and an eccentric drive 8 linkage rods 9.

Reference numeral 20 refers to a hypothetical dividing plane, and the plate 5 with the drives 10 and the needles 11 that are shown to the left of that dividing line 20 have reached in that instant a deep penetration of the needles into a wooden workpiece 15. To the right of that plane 20, plate 5 drives 10 and needles 11 are illustrated in a position of farthest pin and needle retraction. Accordingly, one can see that the follower plates 6, as against the springs 7 assumed the closest position to the plate 5 in the left-hand portion of the drawing. The spring 7 is fully compressed, and the spring force being at its maximum so that plate 6 frictionally engages piece 15 causing the carriage to move with wood. In the right-hand portion of the FIGURE the follower plate 6 is farthest from mounting plate 5, spring 7 at that point being fully relaxed and plate 6 is disengaged from wood 15.

In operation, the device as described and illustrated operates as follows: A piece of wood 15, which is a plank, a board, a barrel, rod, or the like, moves past the equipment at a particular speed V as is illustrated by the arrow in the lower portion of the FIGURE. It is moreover assumed that the drive for this piece of wood imparts upon it a uniform, i.e., constant speed, and the motion of course occurs in the drawing to the right.

Prior to the perforating operation, the spring 3 forces the carriage 2 and therefore the head with the needles 11 and their drives, etc., against the left hand mounting element 1*b*. The excenter drive 8 rotates on a continuous basis (but that is not essential, stepwise or pulsating operation is well within the realm of the invention), imparts upon the transmission linkage and rods 9 a motion according to which the plate 5 is moved away from the basic part of the carriage 2, which means that the plate 5 is moved in a direction towards the piece 15. Or to say it in a different way, the right hand portion of the FIGURE shows the plate 5 and the drive 10 with needles 11 in an operating position at the time carriage 2 abuts against mount 1*b*. Now the drive 8 moves plate 5 towards workpiece 15. As the plate 5 is advanced towards the workpiece 15, it can be seen from the right-hand portion of the FIGURE that the follower plate 6 will engage the surface of the workpiece 15 prior to any penetration by any of the needles into the wood. This means that through frictional engagement and reinforced by the spring 7, the carriage 2 is coupled to the advancing workpiece 15, thus the carriage 2 is stabilized vis-a-vis the workpiece 15 by this frictional engagement.

Soon the needles 11 will penetrate into the wood 15. Due to the fact that this perforating head is mounted in a manner which permits it to follow the motion of the wood 15 (arrow-V), there is no lateral motion effective between the needles 11 and the workpiece 15, so that in fact the needles are not subjected to any bending movement. In the meantime, drive 8 continues to cause the plate 5 to advance towards workpiece 15, so the needles 11 will penetrate deeper into the wood while the carriage 2 is continued to move along with the woodpiece 15.

At the same time water may be sprayed upon the wood, such water spraying may commence earlier, i.e., before the piece of wood 15 reaches the treatment station, or the piece of wood may be wet because it was submerged in a water tank to soak up a certain quantity of water, or the wood may be so fresh that its inherent moisture is sufficient. In either case, the needles as they penetrate into the wood are cooled, as well as lubricated by the water content of the piece of wood 15.

After the needles have penetrated the wood to the maximum point of penetration, drive 8 causes the plate 5 to retract to the needles and the drive 10 are withdrawn. This withdrawal must be completed before the carriage 2 through the spring 3 abuts against the mounting facility 1*a*. It can readily be seen that the needles 11 will be retracted from the workpiece 15 before the follower plate 6 disengage from the workpiece 15; this means that up to a period after full withdrawal of the needles 11, the carriage 2 will move with the workpiece 15 in precise speed and phase synchronism therewith. Only after the needles 11 have been fully withdrawn, and pursuant to continued motion of the drive 8 will the plate 5 be withdrawn to such an extent that the follower plate 6 can disengage from the workpiece 15.

The needles 11 will be driven on a continuous basis. In principle of course they do not have to rotate while they are disengaged from the workpiece 15, but for practical purposes it may well be advisable to construct the system such that the motors or drives 10 drive the needles 11 on a continuous basis regardless whether or not they penetrate into a piece of wood or not. In any case, the perforating process is accompanied on a continuous basis by rotation of the needles.

After the needles have been fully retracted from the wood 15, the spring 3 will tend to expand, and that in turn will cause the carriage 2 to move back to the left until it abuts mounting part 1*b*. The entire arrangement should be dimensioned such that the horizontal back-and-forth movement of the carriage 2 on one hand, and the operating cycle provided by the drive 8 on the other hand may in relation to the advancing speed V of the piece of wood make sure that on continuing of the operation the previously perforated portion of the wood 15 has fully passed through the station before in the next cycle the needles 11 return to the wooden piece 15 to perforate the next portion of the piece 15. It can thus be seen that the entire equipment is designed to make sure that the needles do not experience bending moments.

The FIGURE can be interpreted differently. The drives 10 can be considered in representation of imparting upon the needles 11 an axially reciprocating motion which occurs basically at a higher rate than the reciprocating motion of the plate 5 under control of drive 8. This aspect then leads to the configuration that it is well within the scope of the invention to impart upon the needles 11 such an oscillatory motion in common. Moreover, such an oscillatory motion, depending upon the rate of occurrence and reoccurrence, can be interpreted as a supplemental impacting motion which in a shocklike manner forces the needles into the wood over and above the more gradually occurring reciprocating, i.e., advancing and retracting motion imparted upon the needle mounting plate 5 by the drive 8. Still alternatively, drive 8 may run irregularly such that the penetration is forced through a high speed advance, which subsequent retraction and earlier advance towards the wood occurs slower.

The invention is not limited to the embodiments described above, but all changes and modifications thereof not constituting departures from the spirit and scope of the invention, are intended to be included.

We claim:

1. Method for preparing a wooden piece for being impregnated with a liquid, comprising the steps of:
- perforating the surface of the wood by means of a plurality of needles being moved forward and away from the workpiece;
- imparting upon the needles an additional motional component, being either an oscillating movement in axial direction or a rotational movement; and
- concurrently providing for water lubrication and cooling of the needles as they penetrate the wood.

2. Method as in claim 1 wherein said needles are continuously rotating about their respective longitudinal axis.

3. Method as in claim 1 wherein said needles in addition to the reciprocating motion towards and away from the woodpiece and provided for a shockwise axial movement.

4. Method as in claim 1 wherein said needles in addition to the reciprocating axial motion receive an oscillating motion in axial direction.

5. Method as in claim 1 including the step of using needles with oval cross-section.

6. Method as in claim 1 and comprising the step of causing a plurality of needles to be concurrently forced into the wood, and to be concurrently retracted therefrom.

7. Method as in claim 1 and including the step of driving each of the needles individually for rotating operation.

8. Method as in claim 1 and including the step of causing said needles to undergo additional oscillating or impacting motion in unison.

9. Apparatus for perforating a piece of wood comprising:
- first means establishing a guide track parallel to a path of movement for a wooden workpiece to be perforated;
- a carriage reciprocating on said guide means;
- a carrier plate mounted on said carriage for movement transversely to the direction of carriage movement;
- a plurality of needles mounted on said carrier plate; and
- means for reciprocating said carrier plate towards and away from a workpiece, thereby carrying perforating needles towards and away from the workpiece.

10. Apparatus as in claim 9 wherein said needles are each connected to an individual drive, the drive being mounted to the carrier plate.

11. Apparatus as in claim 9 means on said carrier plate for engaging said workpiece to move therewith prior to and to a point of time subsequent to engagement and penetration by the needles into the wooden workpiece.

12. Apparatus as in claim 11, there being spring means for reciprocating the carriage back into a starting position.

* * * * *